Patented Nov. 4, 1941

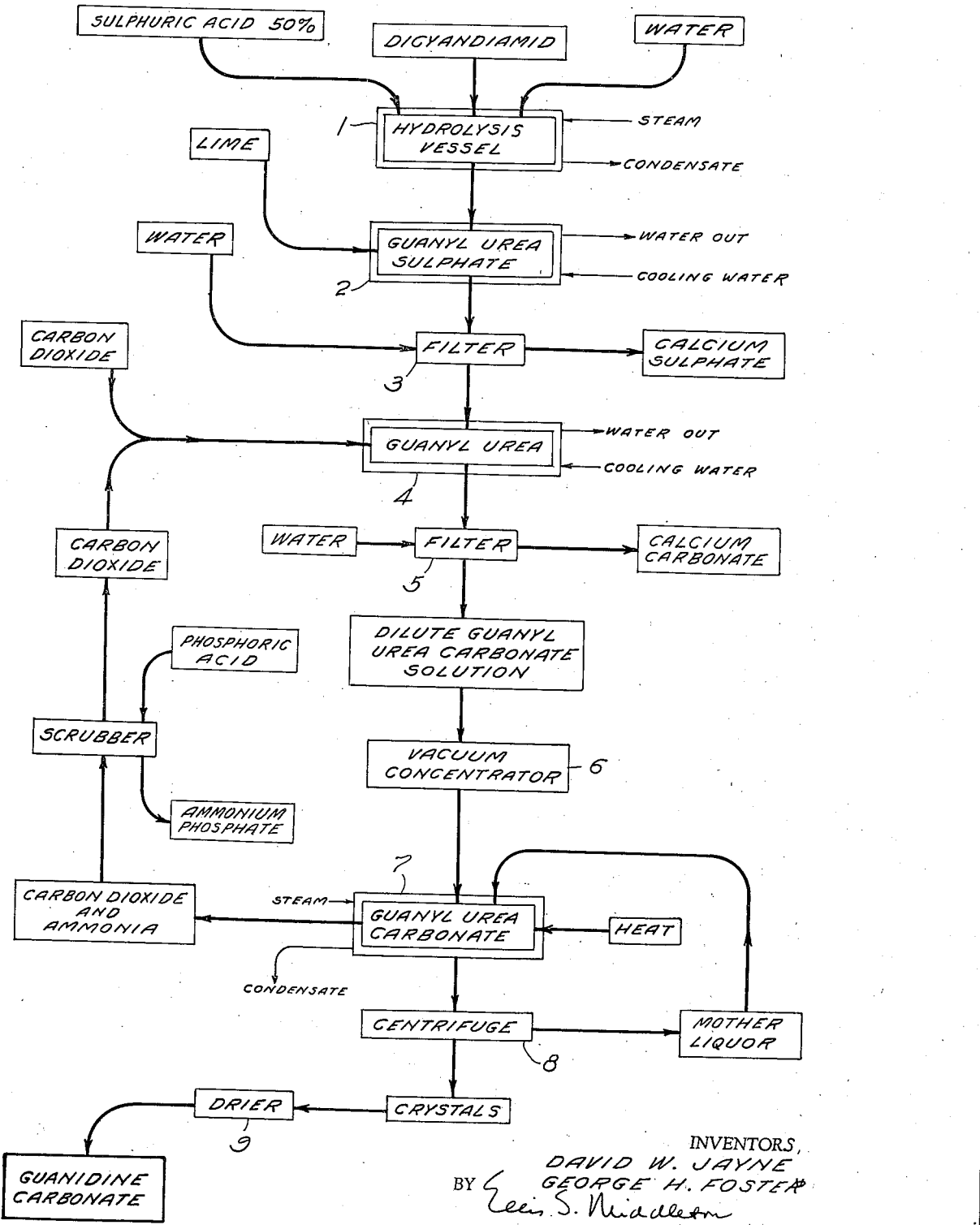

2,261,677

UNITED STATES PATENT OFFICE 2,261,677

METHOD OF MAKING GUANIDINE CARBONATE

George H. Foster, Stamford, and David W. Jayne, Jr., Old Greenwich, Conn., assignors to American Cyanamid Company, New York, N. Y., a corporation of Maine Application February 18, 1939, Serial No. 257,096

6 Claims. (Cl. 260—564)

The present invention relates to the production of guanidine carbonate and intermediate products from which it may be prepared.

The first object of the invention is to devise a method wherein crystals of guanidine carbonate of high purity may be readily and cheaply obtained.

Another object resides in a process for the production of guanidine carbonate requiring only simple apparatus with high efficiencies.

Still another object is to produce intermediates simply and in a good state of purity. These products may be used as such for the production of guanidine carbonate therefrom or for other purposes.

It has been discovered by the applicants that guanidine carbonate synthesis may be practiced with desirable efficiencies according to the following reactions:

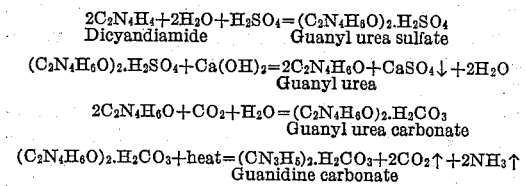

Referring now particularly to the accompanying flow sheet, the invention further contemplates the novel steps and combination of steps hereinafter described in more detail.

The process consists in delivering to the hydrolysis vessel 1, dicyandiamid and water to form a solution which is heated to approximately 100° C. A sufficient quantity of 50% sulfuric acid is added to hydrolyze the dicyandiamid to guanyl urea sulfate. The solution is then passed to tank 2 and cooled to approximately 50° C. Lime is added to remove the sulfate. The reaction mixture is passed to a filter or other separation device 3, the filtrate from which containing the free guanyl urea passes into tank 4. The wet calcium sulfate filter cake is washed with water. The washings are either united with the filtrate or utilized in tank 1 in the hydrolysis of the following batch of dicyandiamid. The guanyl urea solution is carbonated in tank 4 by passing in carbon dioxide. It is necessary to keep the temperature below 60° C., preferably at 40° C., to avoid decomposition of the product and above 30° C. to prevent crystallization of guanyl urea bicarbonate which may be formed. The solution is passed to filter 5, the filtrate from which containing the guanyl urea carbonate passes into the vacuum concentrator 6. The wet calcium carbonate cake on filter 5 is washed with water. The washings are united with the filtrate in tank 6. The dilute guanyl urea carbonate solution in tank 6 is evaporated under vacuum at a temperature not higher than 65° C. and preferably at 60° C., until its specific gravity reaches approximately 1.20. The vacuum is released and the concentrated solution of guanyl urea carbonate passed to tank 7 where it is heated to 100° C. to convert the guanyl urea carbonate to guanidine carbonate.

The object of concentrating the guanyl urea carbonate solution is to produce a solution of such concentration that after conversion to guanidine carbonate a greater portion of the latter will crystallize out on cooling. Furthermore, the rate of conversion of guanyl urea carbonate to guanidine carbonate is much more rapid, and the rate of decomposition of guanidine carbonate relatively less in a concentrated solution. The step of concentrating the guanyl urea carbonate solution may be conducted at higher temperatures when only small quantities of solution are exposed so that the evaporation takes place over a relatively short period of time, preferably not more than ten minutes.

Ammonia and carbon dioxide are liberated during the conversion of guanyl urea carbonate to guanidine carbonate. The ammonia is recovered by passing the gases through a phosphoric acid scrubber, while the carbon dioxide is returned to the carbonating tank 4. The slurry in tank 7 is cooled to room temperature to cause further crystallization of guanidine carbonate, and is then passed to the centrifuge 8. The crystals are separated from the mother liquor and passed to drier 9. The mother liquor is returned to tank 7 and united with the following batch.

Example

To a charge of 400 pounds of water including wash water from a previous batch, are added 180 pounds of dicyandiamid. The solution is heated in an acid resistant kettle to 100° C. 240 pounds of 50% sulfuric acid are added as fast as possible, the rate being regulated by the degree of boiling produced. This step requires about half an hour. The reaction mixture is cooled to approximately 50° C. The addition of 120 pounds of lime is started, cooling being continued during this reaction. When a test with calcium chloride solution shows absence of sulfate, the batch is filtered and washed in a plate and frame press. About 365 pounds of wet calcium sulfate cake are recovered, carrying 1.8 pounds of nitrogen.

The wash water from the filter cake is added to the filtrate until the specific gravity of the washing has fallen to 1.06 and the remainder, about 400 pounds, is utilized in making up the dicyandiamid solution for the following batch. This wash water solution containing the guanyl urea base would be decomposed when heated. It is, therefore, neutralized with sulfuric acid to convert the base to the more stable sulfate. It contains about 16 pounds of nitrogen.

The combined filtrate and first wash, weighing 630 pounds, is carbonated by passing in fifty pounds of carbon dioxide. A clarifying filtration removes the calcium carbonate cake. During carbonation, the solution warms up and must be cooled, if necessary, to keep the temperature below 60° C., and preferably at 40° C.

The solution of guanyl urea carbonate is now evaporated under vacuum at a temperature not higher than 65° C., and preferably at 60° C. until its specific gravity rises to 1.20. Escape of gases during this step causes the solution to foam strongly.

The vacuum is now released and heat applied. At 100° C., an exothermic reaction starts and water is evaporated which must be replaced to prevent too much drying out of the slurry containing guanidine carbonate crystals. A negative test for guanyl urea shows the end of the conversion which is ordinarily complete in one to four hours. The ammonia and $CO_2$ evolved as a result of the reaction here, are passed through an acid scrubber, the $NH_3$ recovered and the $CO_2$ returned to the cycle.

The slurry is cooled to room temperature to complete crystallization. 152 pounds of guanidine carbonate crystals and 39 pounds of mother liquor are obtained. The crystals are dried at approximately 85° C. in a tray drier. The dry crystals weigh 126 pounds.

The mother liquor from the guanidine carbonate crystallization step contains 23% nitrogen or nine pounds of nitrogen equivalent to 19.3 pounds of guanidine carbonate. Assuming this to be all recoverable and assuming further that 80% of the nitrogen in the wash water added to the next batch can be recovered to give an added 27.5 pounds of guanidine carbonate, the total indicated yield becomes 172.8 pounds. Neglecting any purity factor for the dicyandiamid, the 180 pounds charged plus the added wash water contained 120+7.7=127.7 pounds of nitrogen equivalent to 205.5 pounds of guanidine carbonate. The indicated yield on this basis is 84% or 0.86 pound of guanidine carbonate per pound of dicyandiamid.

A composite sample from several batches had a titration equivalent to 93.5% guanidine carbonate, whereas individual batches run as high as 95%.

While the invention has been described with particular reference to specific embodiments, it is to be understood that it is not to be limited thereto, but is to be construed broadly and restricted solely by the scope of the appended claims.

We claim:

1. A method of making guanidine carbonate which includes heating a concentrated solution of guanyl urea carbonate having a specific gravity of approximately 1.2 to approximately 100° C., removing the carbon dioxide and ammonia gases thus liberated and cooling the solution of guanidine carbonate to a temperature sufficient to cause the guanidine carbonate to crystallize out.

2. A method of making guanidine carbonate which includes the steps of evaporating a guanyl urea carbonate solution under vacuum to a specific gravity of approximately 1.2, heating the concentrated solution of guanyl urea carbonate to approximately 100° C., removing the carbon dioxide and ammonia gases thus liberated and cooling the solution of guanidine carbonate to a temperature sufficient to cause the guanidine carbonate to crystallize out.

3. A method of manufacturing guanidine carbonate which comprises reacting a solution of guanyl urea with carbon dioxide, evaporating the solution of guanyl urea carbonate under vacuum to a specific gravity of approximately 1.2, heating the concentrated solution of guanyl urea carbonate to approximately 100° C., recovering the carbon dioxide from the gases thus liberated, cooling the solution of guanidine carbonate to cause the guanidine carbonate to crystallize out, centrifuging the crystals, returning the mother liquor to the evaporator and drying the guanidine carbonate crystals and recycling the recovered $CO_2$ to react with oncoming guanyl urea in solution.

4. The method of claim 3, in which the solution of guanyl urea is reacted with carbon dioxide at a temperature of approximately 40° C.

5. The method of claim 3, in which the solution of guanyl urea carbonate is evaporated under vacuum to a specific gravity of approximately 1.2 at a temperature of approximately 60° C.

6. The method of claim 1 in which the $CO_2$ generated by heating the solution of guanyl urea carbonate is returned to the cycle for reaction with oncoming quantities of guanyl urea.

GEORGE H. FOSTER.
DAVID W. JAYNE, JR.